J. M. SHAW.
COOKER.
APPLICATION FILED MAR. 4, 1918.

1,331,530.

Patented Feb. 24, 1920.

INVENTOR
Jennie M. Shaw.

WITNESSES
Albert Davis
Wm H Mulligan

BY Richard B Owen.

ATTORNEY

UNITED STATES PATENT OFFICE.

JENNIE M. SHAW, OF BEGGS, OKLAHOMA.

COOKER.

1,331,530.  Specification of Letters Patent.  Patented Feb. 24, 1920.

Application filed March 4, 1918. Serial No. 220,336.

*To all whom it may concern:*

Be it known that I, JENNIE M. SHAW, a citizen of the United States, residing at Beggs, in the county of Okmulgee and State of Oklahoma, have invented certain new and useful Improvements in Cookers, of which the following is a specification.

This invention relates to culinary utensils and more particularly to an improved cooker or boiler especially adapted for cooking food stuff without danger of burning.

The principal object of the invention is to provide a cooker adapted to hold the food stuff above the water level in the boiling chamber so that the steam and boiling water may be permitted to pass through the food stuff while the latter will not be in direct contact with the water in the boiler.

A further object of this invention is the provision of a device of this character which consists of comparatively few parts and is simple in construction but durable and well adapted to withstand the rough usage to which devices of this character are ordinarily subjected.

For a full description of the invention and the advantage and merits thereof, reference is to be had to the following description and accompanying drawings, wherein:—

Figure 2:
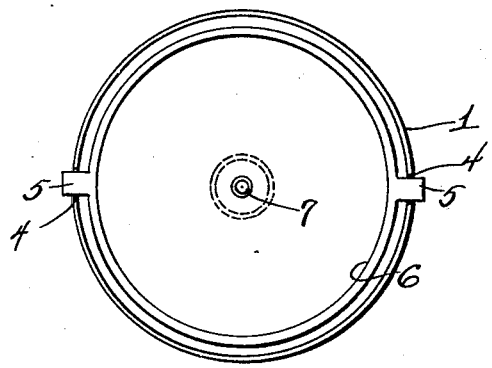
Fig. 2 is a top plan view with the cover removed.

Referring to the drawings, wherein is illustrated the preferred form of my invention, in which like numerals of reference indicate corresponding parts throughout the several views, the water receptacle 1 is of any preferred size and is adapted to receive a quantity of water to be placed over a flame for bringing the water to a boiling point. This receptacle is provided with diametrically opposite lugs 2 to which a bail 3 is attached.

The marginal edge of the receptacle is provided with diametrically opposite notches or recesses 4, and each of these receives a lug 5, two of which are formed on the food container 6 which is of comparatively shallow depth and of a diameter less than the interior diameter of the water receptacle. Projecting centrally through the bottom of the food container is a tubular member 7 which has its upper and lower ends open and the lower end terminates in close proximity to the bottom of the water receptacle while the upper end is substantially flush with marginal edge of the food container as shown in Fig. 1 of the drawing.

Mounted upon the cooker is a cover 8 which is adapted to fit over the exterior of the water receptacle 1 and rest upon the projected ends of the lugs 5. An inner annular flange 9 is integrally formed with the cover and is of a diameter slightly less than the interior diameter of the food container whereby the annular flange 9 may be fitted into the food container when the parts are assembled as shown in Fig. 1. The food container 6 is also provided with a plurality of circumferentially spaced apertures 10 and the lower marginal edge of the flange 9 terminates slightly above these openings 10, so that communication is established between the interior of the water receptacle and the interior of the food container. The cover, being in engagement with the lugs 5 will act to hold the food container in proper position while the interior of the food container and the space embraced by the flange 9 form a comparatively large cooking chamber 11.

Figure 1:
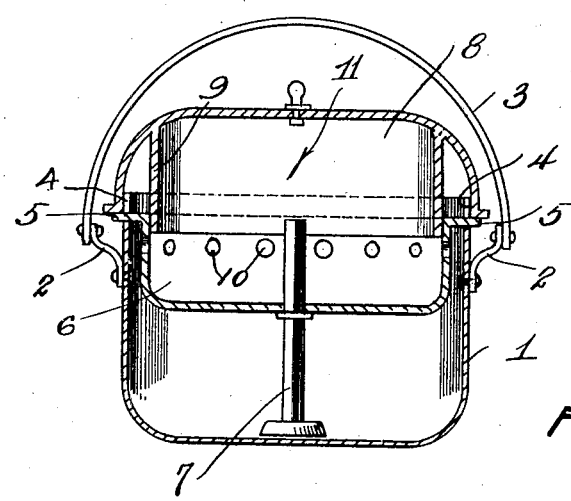
Figure 1 is a vertical section through the cooker constructed in accordance with my invention.

In operation, the parts will be assembled as shown in Fig. 1 and the water placed within the water receptacle 1, the food being placed in the food container 6. As soon as the water comes to a boil, the tube 7 will cause the water to bubble up through the tube and into the food container where the boiling water will saturate the food and thus thoroughly cook the same while the openings 10 will permit excessive water to drain from one container to the other.

In this manner the food will be thoroughly cooked without being submerged in the boiling water and an efficient cooker is thereby provided.

From the foregoing it will be observed that a very simple and durable cooker has been provided, the details of which are embodied in the preferred form. I desire it to be understood, that slight changes may be made in the minor details of constructions, without departing from the spirit of the invention or the scope of the claims hereunto appended.

I claim:

A cooker comprising a water container having its marginal edge provided with diametrically opposite notches, a food container adapted to be suspended within the water container and of a diameter less than the interior of the water container, the marginal edge of the said food container being provided with diametrically opposite lugs adapted for reception in the said notches whereby the said food container is suspended within the said water container, a cover having an annular flange adapted to rest upon the said lugs and equipped with a depending annular flange adapted to project into the said food container, a tubular member disposed centrally in the water container and projecting upwardly through the bottom of the food container to a point slightly above the lower marginal edge of the said flange within the food container, the latter being provided with a plurality of openings below the said flange on the cover to establish communication between the said food container and the water container.

In testimony whereof I affix my signature in presence of two witnesses.

JENNIE M. SHAW.

Witnesses:
    T. E. JONES,
    E. M. STAPP.